United States Patent
Kreutz et al.

(10) Patent No.: US 8,799,161 B2
(45) Date of Patent: Aug. 5, 2014

(54) AUTOMATICALLY DECISIONING TRANSACTION REQUESTS

(75) Inventors: Deborah Fay Kreutz, Jacksonville, FL (US); Mary Naureen Sylvester, Jacksonville, FL (US); Shannon Lee Hilliard, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 273 days.

(21) Appl. No.: 12/783,603

(22) Filed: May 20, 2010

(65) Prior Publication Data

US 2011/0288996 A1 Nov. 24, 2011

(51) Int. Cl.
*G06Q 40/00* (2012.01)
*G06Q 20/38* (2012.01)
*G06K 9/00* (2006.01)
*G06Q 20/40* (2012.01)
*G06Q 40/02* (2012.01)

(52) U.S. Cl.
CPC ............... *G06Q 40/02* (2013.01); *G06Q 20/40* (2013.01)
USPC .................................. 705/44; 705/38; 705/39

(58) Field of Classification Search
CPC .......... G06Q 20/38; G06Q 40/00; G06K 9/00
USPC ................................................. 705/38, 39, 44
See application file for complete search history.

(56) References Cited

U.S. PATENT DOCUMENTS

| 6,097,834 | A * | 8/2000 | Krouse et al. ................. 382/137 |
| 7,191,151 | B1 * | 3/2007 | Nosek ............................. 705/39 |
| 7,797,239 | B2 * | 9/2010 | Smith ............................. 705/44 |
| 2009/0150288 | A1 * | 6/2009 | Bishop et al. ................... 705/44 |

OTHER PUBLICATIONS

Muller, J. D. (1998). Selected development in the law of cyberspace payments. The Business Lawyer, 54(1), 403-441. Retrieved from http://search.proquest.com/docview/228450582?accountid=14753.*

Mitchell,Joseph Pershing, I.,II. (2000). The central bankers: Administrative legitimacy and the federal reserve system. (Order No. 3065450, Virginia Polytechnic Institute and State University). ProQuest Dissertations and Theses, 269-269 p. Retrieved from http://search.proquest.com/docview/304626254?accountid=14753.*

Labys, W. P. (2001). Essays on microstructure and the use of information in limit order markets. (Order No. 3003649, University of Pennsylvania). ProQuest Dissertations and Theses, 195-195 p. Retrieved from http://search.proquest.com/docview/251101049?accountid=14753.*

* cited by examiner

*Primary Examiner* — Muriel Tinkler
(74) *Attorney, Agent, or Firm* — Banner & Witcoff, Ltd.; Michael A. Springs

(57) ABSTRACT

A system and method of automatically decisioning transaction requests is provided. In some examples, a decisioning system may receive customer transaction limit information, as well as current activity information. The system may determine whether a requested transaction is within a first transaction limit. If not, the system may determine whether the requested transaction is within a second transaction limit. If so, one or more business rules may be applied to the requested transaction to determine whether the transaction is approved.

16 Claims, 6 Drawing Sheets

US 8,799,161 B2

AUTOMATICALLY DECISIONING TRANSACTION REQUESTS

BACKGROUND

Today's banking industry, like many industries, is looking for ways to improve efficiency. For instance, financial institutions are often looking to process transactions more quickly, and essentially perform more work in less time. Additionally, many financial institutions have users, such as customer service representatives, and the like, handling transactions. This can lead to inefficient work processes, as well as inconsistencies in the transactions being handled. For instance, financial institutions generally transmit credit or other transaction limit information to entities that then review requested transactions and determine whether they are approved. This can lead to inaccurate information being transferred because the limit information may be outdated by the time it reaches the reviewing entity. Also, this may delay processing because a request for the limit information must be made and the limit information must be sent back to the entity before a decision regarding the transaction can be made. Accordingly, a system and method of automatically determining whether the transaction is approved at the financial institution would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a system and method of automatically decisioning transaction requests are provided. In some examples, the automatic decisioning is used to manage risk associated with approval of the transactions. For instance, the system and method may include receiving account activity information and transaction limit information associated with a customer of a financial institution. In some examples, the account activity information and limit information may be received in real time. The system and method may further include determining whether a requested transaction is within a first transaction limit. If the requested transaction is not within the first transaction limit, the system and method may determine whether the requested transaction is within a second transaction limit. If so, the system and method may automatically apply one or more business rules to the requested transaction to determine whether the transaction is approved. In some examples, the one or more business rules may include a risk rate of the customer meeting a predetermined threshold and/or an amount of the transaction being within a predetermine threshold.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
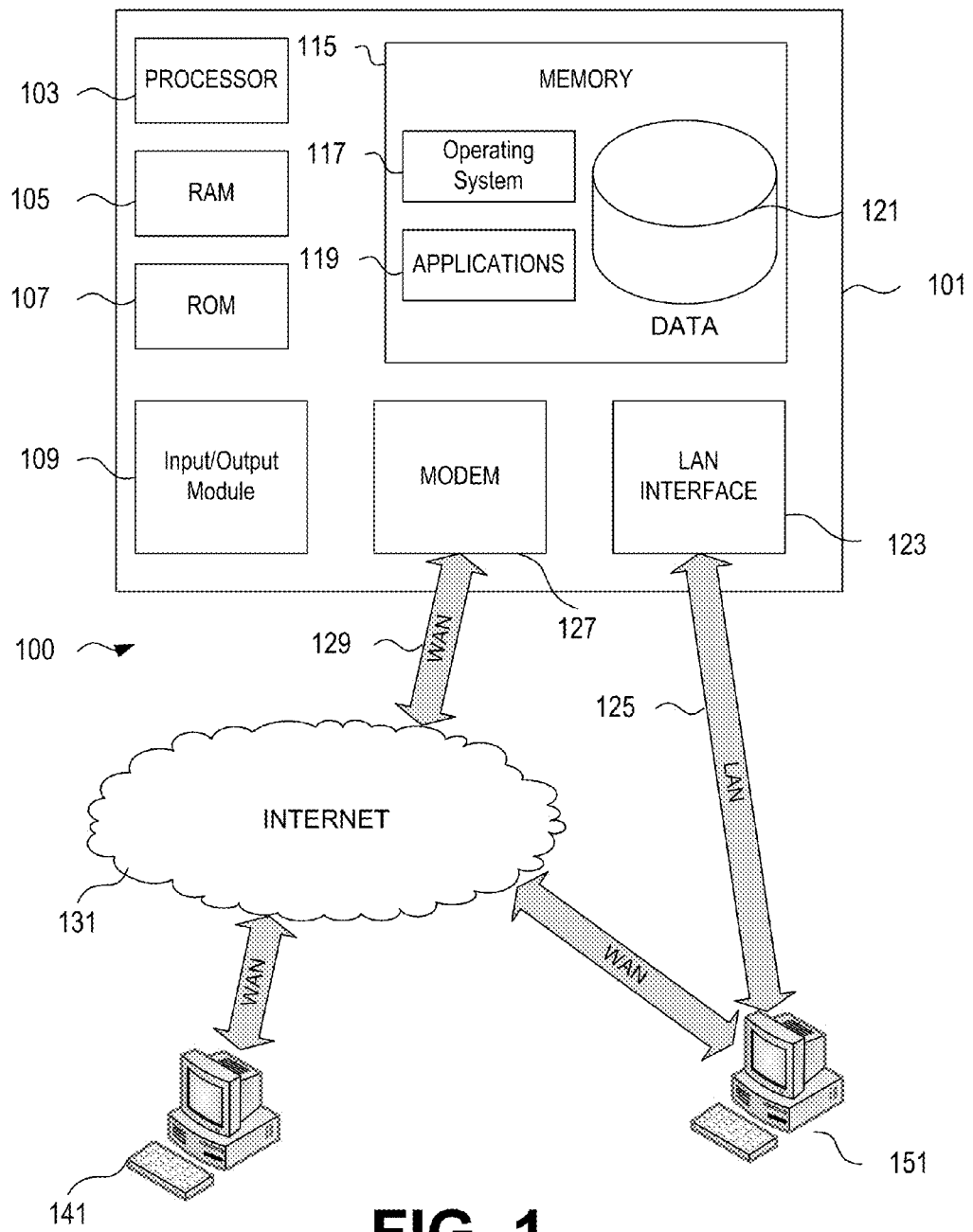
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used.

The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in financial institutions to provide risk management and automatic decisioning of transactions. For instance, various computing systems may be used to track and maintain customer activity, credit limits, and the like. In some examples, this information may be available in real time. Accordingly, when a customer transaction is requested, a determination may be made as to whether that transaction is within a predefined customer transaction limit. If so, the transaction may be approved. If not, a secondary decision may be made as to whether the transaction is within a secondary limit associated with the customer. If so, one or more business rules may be applied to the transaction to automatically determine whether the transaction may be approved. Alternatively, if the transaction request does not fit the criteria for automatic decisioning, the transaction may be forwarded to a suspend queue where a user may review the requested transaction and determine whether the transaction may be approved.

Figure 2:
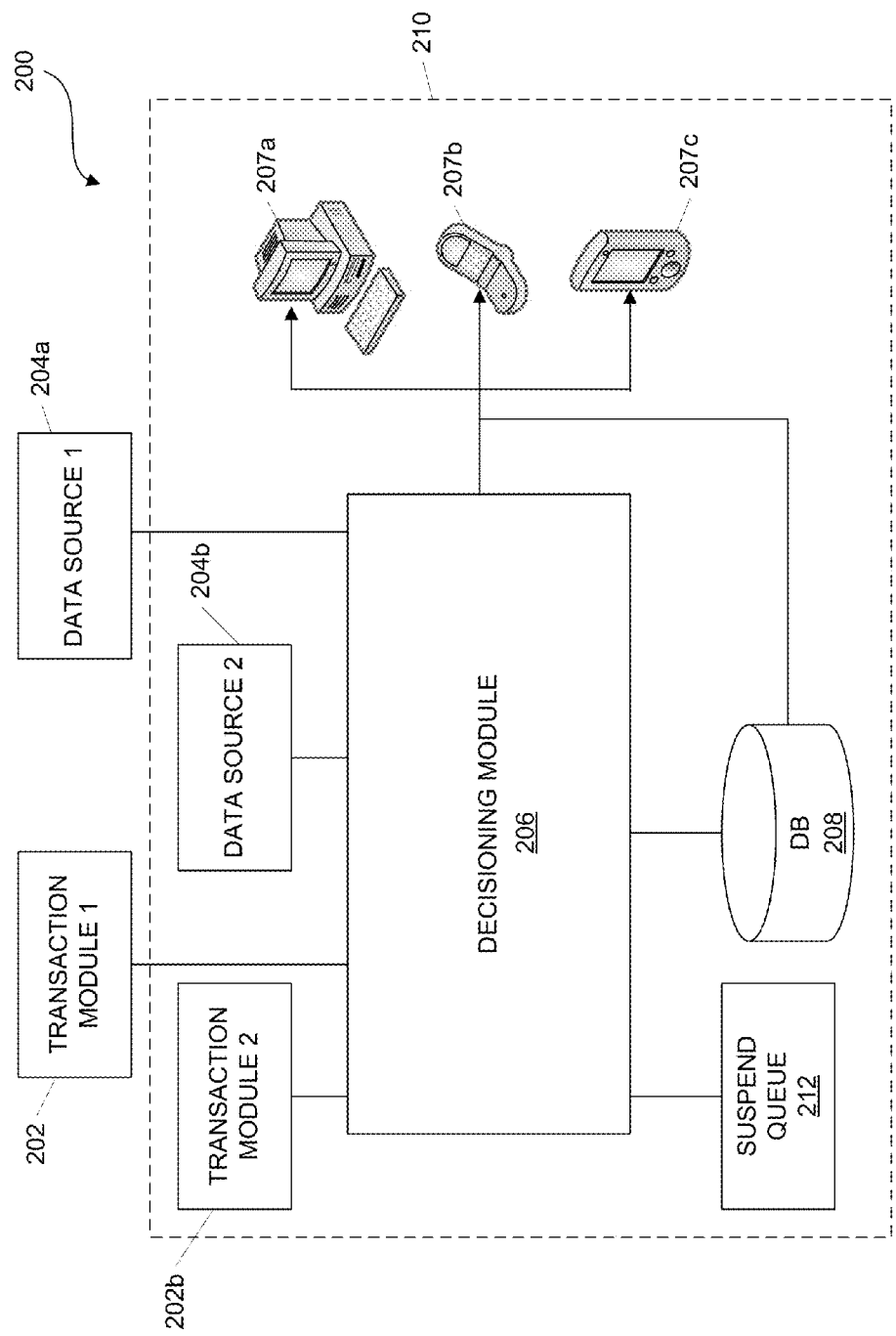
FIG. 2 illustrates an example system for automatically decisioning transaction requests according to one or more aspects described herein.

FIG. 2 illustrates one example system 200 in which a transaction request may be processed. The system may include one or more transaction modules, such as transaction module 1 202a and transaction module 2 202b, that may include one or more computing systems and/or may include one or more processors, memory, and the like. Various types of hardware, software, firmware, and the like may be used in the transaction module without departing from the invention. These transaction modules 202 may include transaction requests received as well as additional information such as a transaction identifier, type of transaction, amount of transaction, customer information, and the like. The transaction modules 202 may be within the financial institution 210, such as transaction module 2 202b, or may be an external system, such as a vendor or other supplier or supplier system configured to receive and, in some cases process, transaction requests, such as transaction module 1 202a.

The system 200 may further include one or more data sources, such as data source 1 204a and data source 2 204b. The data sources 204 may store data, such as customer data, relating to customer activity, credit limits of the customer, and the like. In some arrangements, this information may be real time data in order to provide the most current information during the decisioning process. One or more data sources 204 may be within the financial institution, such as data source 2 204b or outside the financial institution, such as data source 1 204a. The system 200 may also include a decisioning module 206. The decisioning module 206 may receive transaction requests and other transaction data, such as from the transaction modules 202, as well as customer data, such as from data sources 204. The decisioning module 206 may process the received transaction and customer data and may determine whether a transaction may be approved.

For instance, the decisioning module 206 may receive the transaction request as well as customer credit limits and activity in real time. The decisioning module 206 may then determine whether the requested transaction is within a predetermined credit limit. If so, the transaction may be automatically approved. If the transaction request is outside the predetermined credit limit, the decisioning module 206 may determine whether the requested transaction is within a secondary credit limit. For instance, a customer may have an overall credit limit that may be divided into multiple portions, such as limits for various types of transactions, and the like. Accordingly, although a transaction request may be over one portion of the credit limit designated for that type of transaction, the transaction might be within the overall credit limit associated with that customer. Thus, a secondary decisioning step may be performed to determine whether the transaction may be approved if within the overall limit.

The secondary decisioning step may include applying one or more business rules to the transaction request to automatically determine whether the transaction may be approved. In some examples, the one or more business rules may be stored in the decisioning module 206. The business rules may include a risk score above or below a predetermined threshold, the amount of the transaction being below a predetermined threshold, and the like. In some examples, the business rules may be insufficient to determine whether the transaction may be approved. In those instances, the transaction request may be transmitted to a suspend queue, such as queue 212, and a user may manually determine whether the transaction request may be approved or rejected.

Figure 3:
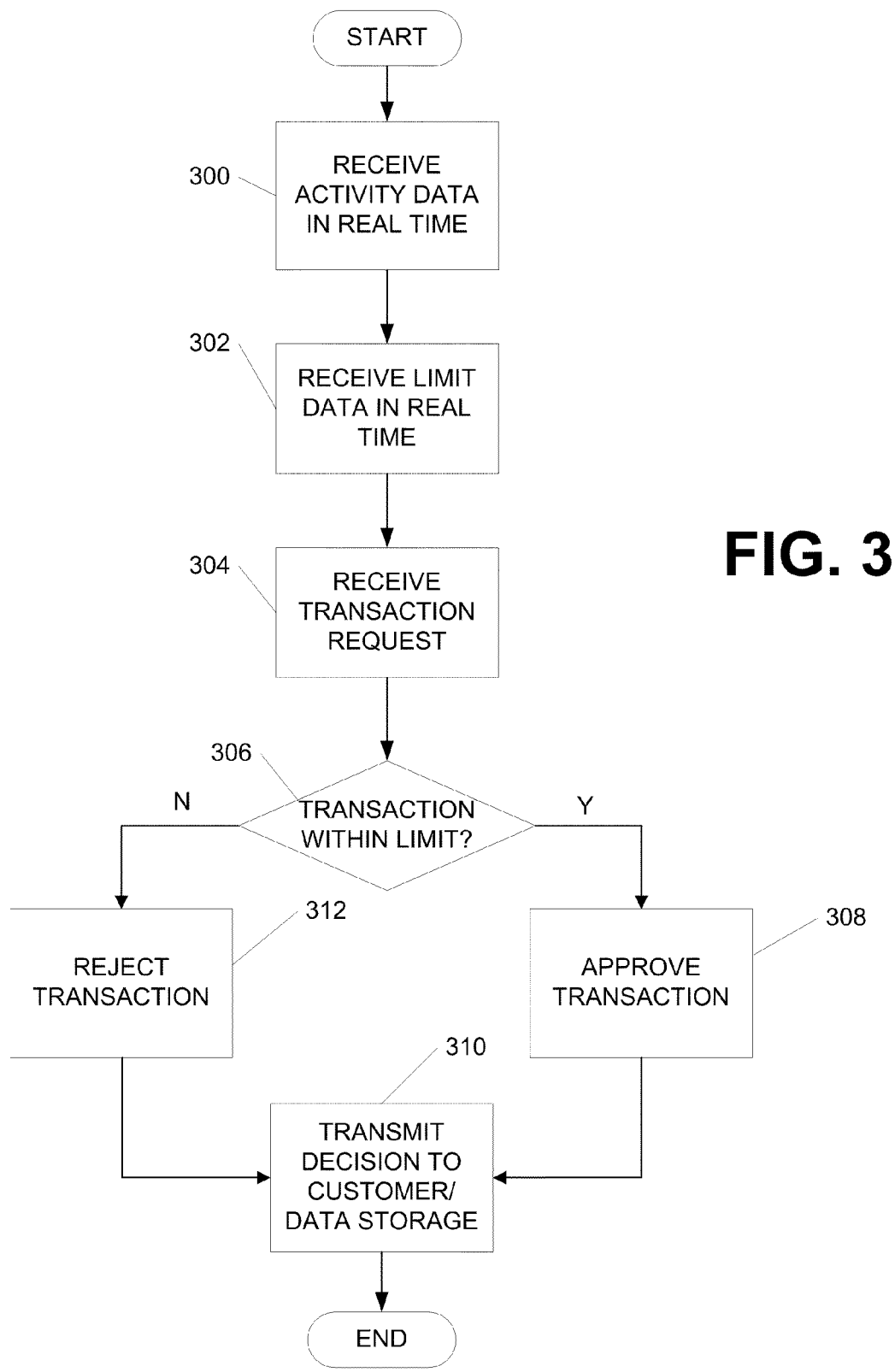
FIG. 3 illustrates one example method of automatically decisioning transaction requests according to one or more aspects described herein.

The system 200 may also include a database 208 or other electronic storage. In some examples, the decisions made regarding transaction requests may be stored in the database 208 and may be used in future decisions. The decisions made may also be transmitted to and from a client team and/or credit/risk responsible parties, such as to user devices 207a-207c. The client team, credit/risk responsible parties, and the like may be the entity requesting the transaction, in some arrangements. That is, the client team, credit/risk responsible parties may interact with the customer and transfer the transaction request to the financial institution, decisioning system, and the like. In some examples, the decision may be transmitted to the client via the client team and/or credit/risk responsible parties. In some arrangements, the decision may not be transmitted directly to the client team, but may go through an intermediary, such as a transaction request processing center. FIG. 3 illustrates one example method of automatically decisioning various transaction requests. In step 300, activity data is received, such as at a decisioning module (206 in FIG. 2). The activity data may include activity associated with one or more customers, such as customers of a financial institution, and may include activity from a predefined time period (e.g., previous four hours, previous 1 day, previous 1 week, previous 1 month, previous 6 months, and the like). In some examples, the activity data may be received in real time in order to ensure the most up-to-date information is available for decisioning.

In step 302 limit data associated with one or more customers is received. The limit data may include one or more financial, transaction, and the like limits associated with the one or more customers. The limit data may, in some examples, be based on the risk rate associated with a customer (e.g., a credit score), as well as other factors. For instance, in some examples, a matrix allowance based on the client risk rate and dollar amount of the client limit may be used as a factor in determining the limit. In some examples, the limit data may be received in real time in order to ensure the most up-to-date information is available for decisioning.

In step 304 a transaction request is received. The transaction request may be associated with one or more customers for which data has been received. The transaction request may include transaction information such as customer name, customer identifier, one or more account numbers, amount of the transaction, and the like. In step 306, a determination is made as to whether the requested transaction is within the limit associated with the customer requesting the transaction. If the request is within the limit, the transaction may be approved in step 308 and the transaction decision may be transmitted to the client team, and the like, which may then transmit the decision to the customer, and/or to data storage for future use in decisioning in step 310. In some examples, the transaction may be automatically approved without user interaction.

If the transaction request is outside the limit, the transaction may be rejected in step 312 and the transaction rejection may be transmitted to the data storage and/or to a client team (and ultimately a customer) for future use in decisioning in step 310. In some examples, the transaction may be automatically rejected without user interaction. In other examples, any transaction rejected as being over a limit may be manually reviewed.

Figure 4:
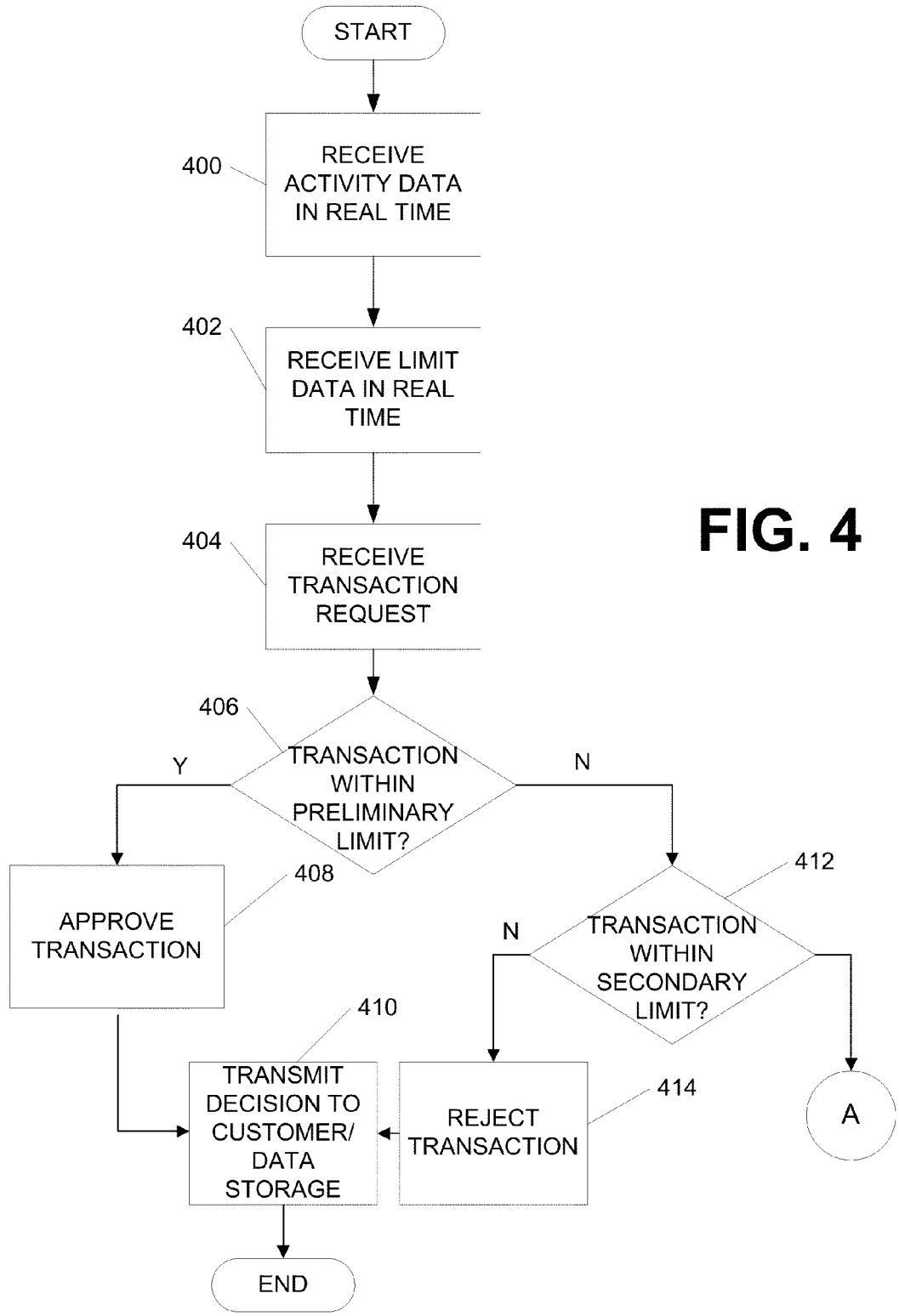
FIG. 4 illustrates another example method of automatically decisioning transaction requests according to one or more aspects described herein.

FIG. 4 illustrates another example of automatically decisioning transaction requests. In step 400 activity data may be received. Similar to the arrangement described above, the activity data may include transaction and/or account activity associated with one or more customers, such as customers of a financial institution. As discussed above, the activity data may be received for a predefined time period. In some arrangements, the activity data may be received in real time in order to provide the most up-to-date information for decisioning.

In step 402 limit data may be received. The limit data may include various limits (transaction limits, amount limits, credit limits, and the like) associated with the one or more customers. The limit data may include one or more limits, such as an overall customer transaction limit, as well as a limit associated with one or more types of transactions, or other partitioned limit which may represent a portion of the overall limit. For instance, a financial institution may have a first limit for a customer limiting automated clearinghouse transactions or amounts associated with those transactions. An automated clearinghouse may be a computerized facility that electronically processes inter-bank credits and debits among member financial institutions. Further, the financial institution may have a second credit or transaction limit that may be an overall limit associated with a customer. In some examples, the amount of the overall limit may include the amount of the first limit. In some arrangements, the limit data may be received in real time in order to provide the most up-to-date information for decisioning.

In step 404 a transaction request may be received from one or more customers. Similar to the arrangement described above, the transaction request may include transaction information such as name of customer, amount of requested transaction, account information, and the like. In step 406 a determination is made as to whether the requested transaction is within a limit. In some examples, the limit may be a preliminary or initial limit that may represent a portion of an overall credit limit associated with the customer. For instance, the preliminary limit may be a credit or other limit associated with particular types of transactions, such as automated clearinghouse transactions.

If the requested transaction is within this preliminary limit, the transaction may be approved in step 408. In some examples, the transaction may be automatically approved without user input. In step 410 the transaction approval may be transmitted to the requesting entity (such as a client team, customer, and the like) and/or to data storage for use in future decisioning. In some examples, an intermediary or other entity may receive the transaction request from the customer and transmit it to the decisioning module. In some examples, this intermediary may be an entity not part of the financial institution at which the decisioning is performed. The transaction decision may then be transmitted to the intermediary who will then transmit the decision to the customer.

If, in step 406, the transaction request is not within the preliminary limit, a determination is made in step 412 as to whether the requested transaction is within a secondary limit. In some examples, the secondary limit may be an overall credit limit associated with the customer. If the requested transaction is not within the secondary limit, the transaction may be rejected in step 414 and the transaction decision may be transmitted to the customer and/or data storage for use in future decisioning in step 410. In some examples, the rejection may be automatically generated/transmitted upon determining that the requested transaction is not within the secondary limit.

Figure 5:
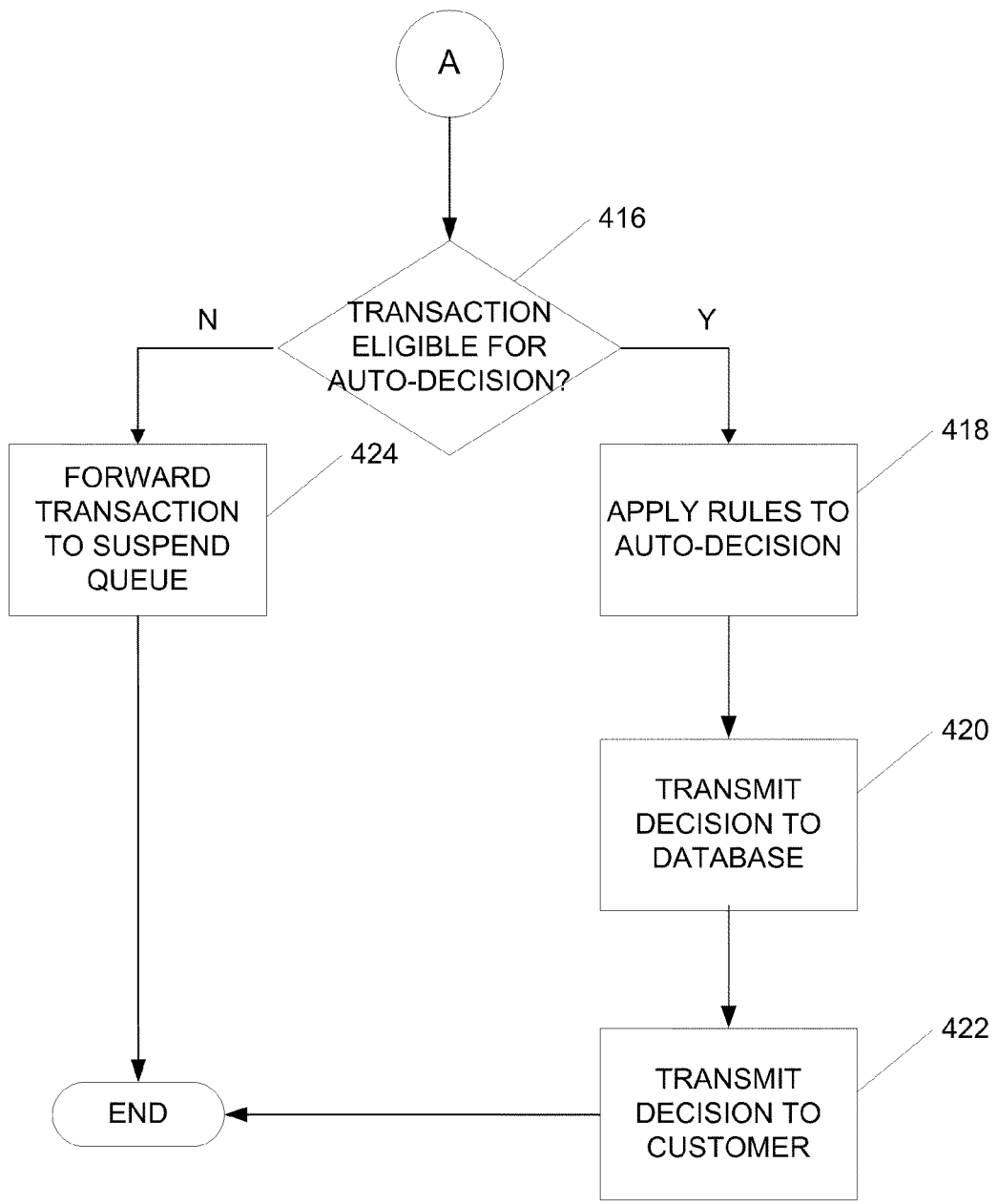
FIG. 5 illustrates yet another example method of automatically decisioning transaction requests according to one or more aspects described herein.

FIG. 5 illustrates an example method of auto-decisioning if the transaction is within the secondary limit in step 412. In step 416 a determination is made as to whether the transaction is eligible for auto-decisioning. For instance, if the transaction request is complex, the transaction may not be eligible for auto-decisioning and, instead, may be transferred to a suspend queue in step 424. Additionally or alternatively, there may be no record of an account/customer associated with the request on the system of the financial institution which may also render the transaction ineligible for auto-decisioning and thus, the transaction may be transmitted to the suspend queue. In still other examples, there may be data integrity issues in that the transaction account owner may not have a corresponding limit, or the transaction owner may have been assigned an incorrect limit. In some arrangements, these issues may render a transaction ineligible for auto-decisioning and the transactions may be sent to the suspend queue for further processing. The suspend queue may include various transactions and decisions, determinations, and the like on the transaction requests within the suspend queue may be handled by a risk monitoring analyst, operational risk manager, and the like.

If the transaction is eligible for auto-decisioning in step 416, one or more business rules may be applied to the transaction request in order to formulate the decision in step 418. For instance, the business rules may include determining that a risk rate associated with the user is within a predetermined threshold. Additionally or alternatively, the business rules may include determining that an amount associated with the requested transaction is within a predefined threshold. The business rules may also include automatically rejecting transactions if a predefined limit applies and the transaction is outside that limit. In some examples, the business rules may be adjusted to alter the leniency of transaction approval. For instance, in poor economic conditions, which lending money is risky (e.g., the a user may adjust the thresholds used in the business rules in order to make it more difficult to approve a transaction. For example, the thresholds may be adjusted such that a customer must have lower risk and the transaction amounts must be relatively small in order to be approved. Alternatively, as desired, the threshold may be adjusted to be more lenient in approving transactions, lending money, and the like by, for instance, approving transactions for higher dollar amount, and the like. In some arrangements, the thresholds or other aspects of the business rules may be adjusted by a business manager or other user via a user interface, as will be discussed more fully below.

As discussed, the decisioning discussed above may be performed automatically. This automatic decisioning may aid in providing more consistency among approval/rejection of transaction requests. In addition, the auto-decisioning may aid in processing transactions more rapidly in order to provide decisions more quickly and process additional transactions. Another advantage of auto-decisioning is that it may allow risk monitoring analysts and others processing the transaction requests to focus on more complex requests while simple cases can be handled automatically without user interaction.

Once the decision is determined in step 418, the decision may be transmitted to a database for storage in step 420. This stored data may then be used in future decisioning steps in order to reduce risk associated with approving transactions. In step 422 the decision may be transmitted to the requesting entity, such as the client team, credit/risk partners, customers, and the like.

Figure 6:
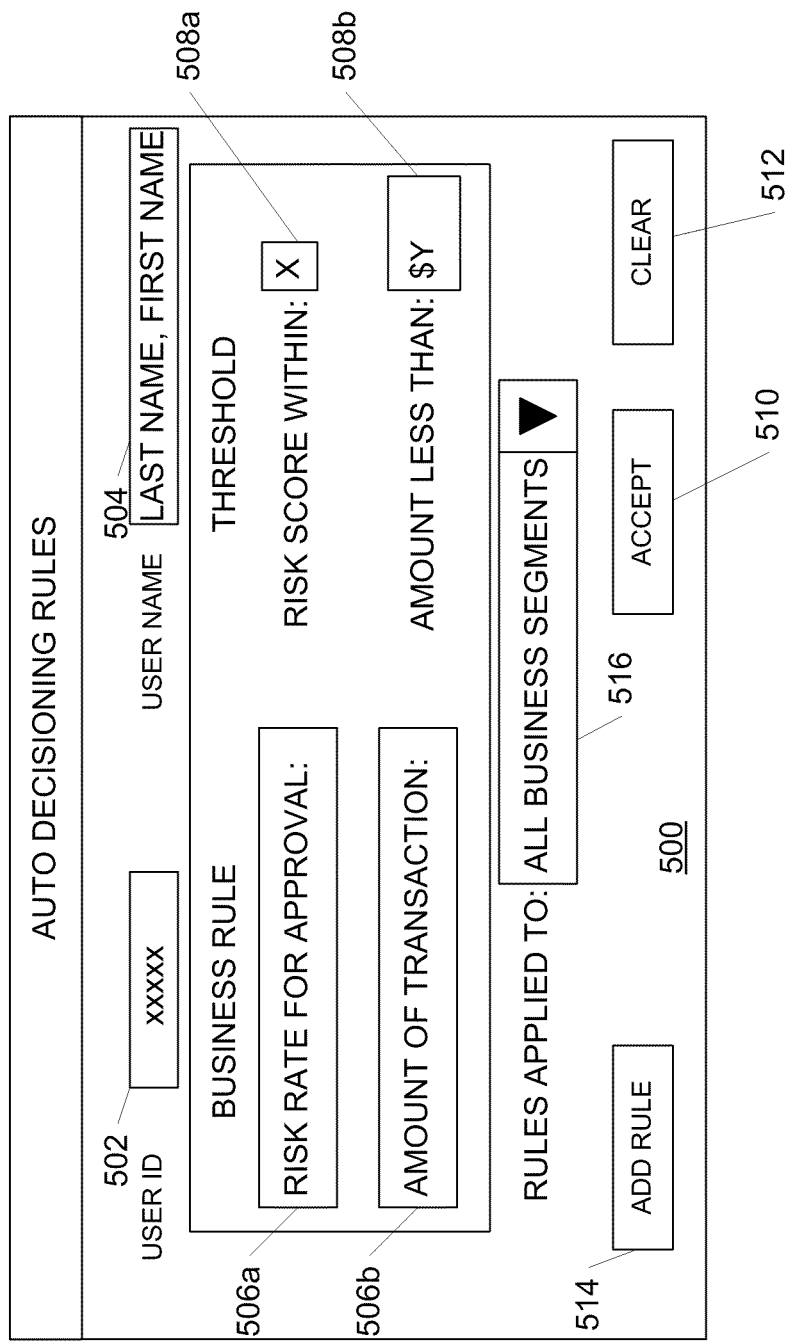
FIG. 6 illustrates one example user interface for providing and adjusting business rules that may be used in automatically decisioning transaction requests according to one or more aspects described herein.

FIG. 6 illustrates one example user interface that may be used to display and/or adjust the business rules applied in auto-decisioning. The user interface 500 may include a user identification 502 of the individual reviewing and/or adjusting the business rules. The user identification may be an employee number or other unique identifier associated with the user. The user interface 500 may further include the user name 504 of the user viewing and/or adjusting the rules. The current business rules that may be applied in auto-decisioning may be provided as shown in fields 506a and 506b. For instance, the user interface includes two business rules: risk rate for approval in field 506a and amount of transaction in field 506b. The predefined threshold required for approval may be shown in fields 508a and 508b. The user may adjust the threshold by clicking, double-clicking, and the like on the field and inserting the desired value. Additionally or alternatively, the user may select the desired value from a drop-down menu or may select a radio button associated with a desired value in a list of available values.

User interface 500 may further include field 516 which may include options for applying the business rules, such as rules 506a and 506b and associated thresholds 508a and 508b. In some examples, the same business rules and thresholds may be applied to all business segments. For instance, the rules 506 and thresholds 508 may be applied to all customers requesting a transaction eligible for auto-decisioning, regardless of industry, and the like. Alternatively, the rules 506 and thresholds 508 may be applied to designated customers in designated industries, business segments, and the like to allow customization of auto-decisioning for various industries. For instance, if an industry in general is struggling, the threshold for approval of a transaction may be higher to reduce risk to which the financial institution may be exposed in approving the transaction. Industries, business segments, and the like may be predetermined in some examples and customers may be assigned to a business segment or industry as desired.

Once desired changes have been made to the business rules, a user may select accept option 510 in order to accept the rules and thresholds. Alternatively, a user may select clear option 512 which may clear all inputs or may return the settings to default settings, as desired. Add rule option 514 may also be available to a user. Selection of the add rule option 514 may prompt one or more additional user interfaces which may permit a user to identify a new business rule, the threshold associated with that rule, business segments to which the rule may be applied, and the like.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
receiving, in real time by a computing system having a processor, activity relating to a customer of a financial institution;
receiving, in real time by the computing system, a first transaction limit associated with the customer, wherein the first transaction limit associated with the customer comprises an automated clearinghouse credit limit for the customer, wherein the automated clearinghouse credit limit for the customer comprises at least one value associated with the customer received from a computerized facility that electronically processes inter-bank credits and debits among member financial institutions;
receiving, by the computing system, a request for a transaction by the customer;
automatically determining, by the computing system, whether the requested transaction is within the received real time first transaction limit associated with the customer by determining whether the requested transaction is within the automated clearinghouse credit limit for the customer, wherein determining whether the requested transaction is within the automated clearinghouse credit limit for the customer comprises determining whether the requested transaction is within the at least one value associated with the customer received from the computerized facility that electronically processes inter-bank credits and debits among the member financial institutions;

responsive to automatically determining that the transaction is not within the real time first transaction limit associated with the customer, determining, by the computing system, a second real time transaction limit associated with the customer, wherein the second real time transaction limit associated with the customer comprises an overall credit limit for the customer;

determining, by the computing system, whether the requested transaction is within the determined second real time transaction limit associated with the customer by determining whether the requested transaction is within the overall credit limit for the customer;

responsive to determining that the requested transaction is within the determined second real time transaction limit associated with the customer, determining, by the computing system, whether the requested transaction is eligible for application of a business rule;

responsive to determining that the requested transaction is eligible for application of the business rule:

determining, by the computing system, whether an amount of the requested transaction is within a predetermined amount threshold specified by the business rule and whether a risk rate of the customer is below a predetermined risk rate threshold specified by the business rule;

responsive to determining that the amount of the requested transaction is within the predetermined amount threshold specified by the business rule and that the risk rate of the customer is below the predetermined risk rate threshold specified by the business rule, approving, by the computing system, the requested transaction; and responsive to determining that the amount of the requested transaction is not within the predetermined amount threshold specified by the business rule or that the risk rate of the customer is not below the predetermined risk rate threshold specified by the business rule, transferring, by the computing system, the requested transaction to a queue of requested transactions for manual approval determination by a risk analyst of the financial institution; and responsive to determining that the requested transaction is not eligible for application of the business rule, transferring, by the computing system, the requested transaction to the queue of requested transactions for manual approval determination.

2. The method of claim 1, wherein the overall credit limit for the customer includes the first transaction limit associated with the customer.

3. The method of claim 1, further including transmitting, by the computing system, a determination of whether the transaction is approved to data storage for use in future determinations.

4. The method of claim 1, wherein responsive to determining that the requested transaction is within the first transaction limit, approving, by the computing system, the requested transaction.

5. A method, comprising:

receiving, by a computing system having a processor, transaction limit information associated with a customer of a financial institution, the transaction limit information including at least a first transaction limit associated with the customer and a second transaction limit associated with the customer, wherein the first transaction limit associated with the customer comprises an automated clearinghouse credit limit for the customer, wherein the automated clearinghouse credit limit for the customer comprises at least one value associated with the customer received from a computerized facility that electronically processes inter-bank credits and debits among member financial institutions, and wherein the second transaction limit associated with the customer comprises an overall credit limit for the customer;

receiving, by the computing system, a transaction request by the customer;

automatically determining, by the computing system, whether the requested transaction is within the first transaction limit associated with the customer by determining whether the requested transaction is within the automated clearinghouse credit limit for the customer, wherein determining whether the requested transaction is within the automated clearinghouse credit limit for the customer comprises determining whether the requested transaction is within the at least one value associated with the customer received from the computerized facility that electronically processes inter-bank credits and debits among the member financial institutions;

responsive to determining that the requested transaction is not within the first transaction limit associated with the customer, automatically determining, by the computing system, whether the requested transaction is within the second transaction limit associated with the customer by determining whether the requested transaction is within the overall credit limit for the customer;

responsive to determining that the requested transaction is within the second transaction limit associated with the customer, automatically determining, by the computing system, whether the requested transaction is eligible for application of an auto-decisioning business rule;

responsive to determining that the requested transaction is eligible for application of the auto-decisioning business rule:

determining, by the computing system, whether an amount of the requested transaction is within a predetermined amount threshold specified by the auto-decisioning business rule and whether a risk rate of the customer is below a predetermined risk rate threshold specified by the auto-decisioning business rule;

responsive to determining that the amount of the requested transaction is within the predetermined amount threshold specified by the auto-decisioning business rule and that the risk rate of the customer is below the predetermined risk rate threshold specified by the auto-decisioning business rule, approving, by the computing system, the requested transaction; and responsive to determining that the amount of the requested transaction is not within the predetermined amount threshold specified by the auto-decisioning business rule or that the risk rate of the customer is not below the predetermined risk rate threshold specified by the auto-decisioning business rule, transferring, by the computing system, the requested transaction to a queue of requested transactions for manual approval determination by a risk analyst of the financial institution; and responsive to determining that the requested transaction is not eligible for application of the auto-decisioning business rule, transferring, by the computing system, the requested transaction to the queue of requested transactions for manual approval determination.

6. The method of claim 5, wherein the transaction limit information is received in real time.

7. The method of claim 5, further including transmitting, by the computing system, an approval determination of the requested transaction to a data storage for use in future decisioning.

8. The method of claim 5, wherein the overall credit limit for the customer includes an amount of the first transaction limit associated with the customer.

9. One or more non-transitory computer readable media storing computer readable instructions that, when executed by at least one processor, cause the at least one processor to:
receive account activity of a customer associated with a financial institution;
receive transaction limit information associated with the customer, the transaction limit information associated with the customer including at least a first transaction limit associated with the customer and a second transaction limit associated with the customer, wherein the first transaction limit associated with the customer comprises an automated clearinghouse credit limit for the customer, wherein the automated clearinghouse credit limit for the customer comprises at least one value associated with the customer received from a computerized facility that electronically processes inter-bank credits and debits among member financial institutions, and wherein the second transaction limit associated with the customer comprises an overall credit limit for the customer;
receive a transaction request by the customer;
automatically determine whether the requested transaction is within the first transaction limit associated with the customer by determining whether the requested transaction is within the automated clearinghouse credit limit for the customer by determining whether the requested transaction is within the at least one value associated with the customer received from the computerized facility that electronically processes inter-bank credits and debits among the member financial institutions;
responsive to determining that the requested transaction is not within the first transaction limit associated with the customer, automatically determine whether the requested transaction is within the second transaction limit associated with the customer by determining whether the requested transaction is within the overall credit limit for the customer;
responsive to determining that the requested transaction is within the second transaction limit associated with the customer, determine whether the requested transaction is eligible for application of a plurality of business rules comprising criteria for approving the requested transaction;
responsive to determining that the requested transaction is eligible for application of the plurality of business rules comprising criteria for approving the requested transaction:
determine whether an amount of the requested transaction is within a predetermined amount threshold specified by the plurality of business rules comprising criteria for approving the requested transaction and whether a risk rate of the customer is below a predetermined risk rate threshold specified by the plurality of business rules comprising criteria for approving the requested transaction;
responsive to determining that the amount of the requested transaction is within the predetermined amount threshold specified by the plurality of business rules comprising criteria for approving the requested transaction and that the risk rate of the customer is below the predetermined risk rate threshold specified by the plurality of business rules comprising criteria for approving the requested transaction, approve the requested transaction; and
responsive to determining that the amount of the requested transaction is not within the predetermined amount threshold specified by the plurality of business rules comprising criteria for approving the requested transaction or that the risk rate of the customer is not below the predetermined risk rate threshold specified by the plurality of business rules comprising criteria for approving the requested transaction, transfer the requested transaction to a queue of requested transactions for manual approval determination by a risk analyst of the financial institution; and
responsive to determining that the requested transaction is not eligible for application of the plurality of business rules comprising criteria for approving the requested transaction, transfer the requested transaction to the queue of requested transactions for manual approval determination.

10. The one or more non-transitory computer readable media of claim 9, wherein the transaction limit information is received in real time.

11. The one or more non-transitory computer readable media of claim 9, wherein the account activity of the customer is received in real time.

12. The one or more non-transitory computer readable media of claim 9, wherein the overall credit limit for the customer includes an amount of the first transaction limit associated with the customer.

13. An apparatus comprising:
a processor; and
memory operatively coupled to the processor and storing computer readable instructions that, when executed, cause the apparatus to:
receive account activity of a customer associated with a financial institution;
receive transaction limit information associated with the customer, the transaction limit information associated with the customer including at least a first transaction limit associated with the customer and a second transaction limit associated with the customer, wherein the first transaction limit associated with the customer comprises an automated clearinghouse credit limit for the customer, wherein the automated clearinghouse credit limit for the customer comprises at least one value associated with the customer received from a computerized facility that electronically processes inter-bank credits and debits among member financial institutions, and wherein the second transaction limit associated with the customer comprises an overall credit limit for the customer;
receive a transaction request by the customer;
automatically determine whether the requested transaction is within the first transaction limit associated with the customer by determining whether the requested transaction is within the automated clearinghouse credit limit for the customer by determining whether the requested transaction is within the at least one value associated with the customer received from the computerized facility that electronically processes inter-bank credits and debits among the member financial institutions;
responsive to determining that the requested transaction is not within the first transaction limit associated with the customer, automatically determine whether the requested transaction is within the second transaction limit associated with the customer by determining whether the requested transaction is within the overall credit limit for the customer;

responsive to determining that the requested transaction is within the second transaction limit associated with the customer, determine whether the requested transaction is eligible for application of a plurality of business rules comprising criteria for approving the requested transaction;

responsive to determining that the requested transaction is eligible for application of the plurality of business rules comprising criteria for approving the requested transaction:

determine whether an amount of the requested transaction is within a predetermined amount threshold specified by the plurality of business rules comprising criteria for approving the requested transaction and whether a risk rate of the customer is below a predetermined risk rate threshold specified by the plurality of business rules comprising criteria for approving the requested transaction;

responsive to determining that the amount of the requested transaction is within the predetermined amount threshold specified by the plurality of business rules comprising criteria for approving the requested transaction and that the risk rate of the customer is below the predetermined risk rate threshold specified by the plurality of business rules comprising criteria for approving the requested transaction, approve the requested transaction; and responsive to determining that the amount of the requested transaction is not within the predetermined amount threshold specified by the plurality of business rules comprising criteria for approving the requested transaction or that the risk rate of the customer is not below the predetermined risk rate threshold specified by the plurality of business rules comprising criteria for approving the requested transaction, transfer the requested transaction to a queue of requested transactions for manual approval determination by a risk analyst of the financial institution; and responsive to determining that the requested transaction is not eligible for application of the plurality of business rules comprising criteria for approving the requested transaction, transfer the requested transaction to the queue of requested transactions for manual approval determination.

14. The apparatus of claim 13, wherein the transaction limit information is received in real time.

15. The apparatus of claim 13, wherein the account activity of the customer is received in real time.

16. The apparatus of claim 13, wherein the overall credit limit for the customer includes an amount of the first transaction limit associated with the customer.

\* \* \* \* \*